United States Patent
Kim et al.

(10) Patent No.: US 7,521,095 B2
(45) Date of Patent: Apr. 21, 2009

(54) METHOD OF FORMING ALIGNMENT LAYER FOR LIQUID CRYSTAL DISPLAY DEVICE

(75) Inventors: Chang Dong Kim, Seoul (KR); Hyun Sik Seo, Anyang-si (KR); Su Hyun Park, Anyang-si (KR); Kwang Hoon Shin, Seoul (KR)

(73) Assignee: LG Display Co., Ltd., Seoul (KR)

( * ) Notice: Subject to any disclaimer, the term of this patent is extended or adjusted under 35 U.S.C. 154(b) by 447 days.

(21) Appl. No.: 11/347,430

(22) Filed: Feb. 6, 2006

(65) Prior Publication Data

US 2006/0176433 A1  Aug. 10, 2006

(30) Foreign Application Priority Data

Feb. 7, 2005  (KR) .................. 10-2005-0011318

(51) Int. Cl.
*H01F 1/00* (2006.01)
(52) U.S. Cl. ....................... 427/547; 427/162
(58) Field of Classification Search .......... 427/547, 427/598, 162
See application file for complete search history.

(56) References Cited

U.S. PATENT DOCUMENTS

| 5,422,748 A | * | 6/1995 | Yamashita et al. | 349/134 |
| 5,552,916 A | * | 9/1996 | O'Callaghan et al. | 349/201 |
| 6,377,414 B1 | * | 4/2002 | Wang | 360/59 |
| 6,466,293 B1 | * | 10/2002 | Suzuki et al. | 349/144 |

FOREIGN PATENT DOCUMENTS

| CN | 1178919 A | | 4/1998 |
| JP | 11-133430 | | 5/1999 |
| JP | 2004163903 A | * | 6/2004 |

OTHER PUBLICATIONS

English equivalent abstract of JP 2004-163903; JPO; 1 page.*

* cited by examiner

*Primary Examiner*—Alain L Bashore
(74) *Attorney, Agent, or Firm*—McKenna Long & Aldridge LLP

(57) ABSTRACT

A method of forming an alignment layer for a liquid crystal display device is disclosed, which includes preparing a substrate; coating the substrate with an alignment material for initial alignment of liquid crystal; rubbing the substrate coated with the alignment material; and applying a field flux to the substrate coated with the alignment material. The alignment material is aligned in a direction determined by the direction of the applied field flux.

13 Claims, 9 Drawing Sheets

METHOD OF FORMING ALIGNMENT LAYER FOR LIQUID CRYSTAL DISPLAY DEVICE

This application claims the benefit of Korean Patent Application No. P2005-11318, filed on Feb. 7, 2005, which is hereby incorporated by reference for all purposes as if fully set forth herein.

BACKGROUND OF THE INVENTION

1. Field of the Invention

The present invention relates to a liquid crystal display device, and more particularly, to an alignment layer for initial alignment of liquid crystal in a liquid crystal display device.

2. Discussion of the Related Art

Ultra-thin flat panel displays include a display screens having a thickness of not more than a few centimeters. Of the available types of ultra-thin flat displays, liquid crystal displays are used in a wide range of applications, such as notebook computers, monitors, spacecraft and aircraft. Liquid crystal displays have low power consumption due to their low operating voltages and are light in weight making them easily portable.

A liquid crystal display of the related art includes a color filter substrate having a color filter layer formed thereon, a thin film transistor substrate arranged opposite to the color filter substrate and having thin film transistors formed thereon, and a liquid crystal layer interposed between the two substrates.

The alignment direction of the liquid crystal layer in the liquid crystal display may be varied in response to an applied voltage, allowing light transmittance through the liquid crystal display to be controlled to display images on a screen. Electrodes are formed on the thin film transistor substrate and the color filter substrate for applying voltages to display images. Specifically, in the case of a twisted nematic (TN) mode, pixel electrodes are arranged on the thin film transistor substrate, and a common electrode is arranged on the color filter substrate, allowing a vertical electric field to be generated between the pixel electrodes and the common electrode. In the case of an in-plane switching (IPS) mode, the pixel electrodes and common electrodes are arranged in parallel on the thin film transistor substrate, thereby allowing a horizontal electric field to be generated between the pixel electrodes and the common electrodes.

FIG. 1 is an exploded perspective view of a TN mode liquid crystal display of the related art.

As shown in FIG. 1, gate lines 12 and data lines 14 crossing each other are formed on a thin film transistor substrate 10. Thin film transistors (T) are formed at crossings of the gate and data lines, and pixel electrodes 16 are connected to the thin film transistors (T). In addition, a light-blocking layer 22 is formed on a color filter substrate 20 to prevent light leakage, an RGB color filter layer 24 is formed on the light-blocking layer 22. A common electrode 25 is formed on the color filter substrate 20. In an IPS mode display, common electrodes and pixel electrodes are formed on the same substrate.

A vertical electric field generated between the pixel electrodes 16 formed on the thin film transistor substrate 10 and the common electrode 25 formed on the color filter substrate 20 can control the alignment direction of a liquid crystal layer formed between the substrates 10 and 20.

The substrates 10 and 20 are attached to each other to form a liquid crystal panel. A liquid crystal layer is formed between the substrates 10 and 20.

In a liquid crystal layer that is not aligned, the liquid crystal molecules of the liquid crystal layer are randomly arranged between the substrates 10 and 20 and have random orientations. Although not shown in the figure, an alignment layer is formed between the thin film transistor substrate 10 and the color filter substrate 20 to provide an initial alignment of the liquid crystal layer.

A related art process for forming the alignment layer for initial alignment of a liquid crystal layer includes rubbing alignment.

Rubbing alignment includes the steps of applying an organic polymer, such as polyimide, to a substrate to form a thin film, curing the thin film, and rolling a rubbing roll covered with a rubbing cloth on the thin film organic polymer. The rubbing alignment arranges the chains of the organic polymer in a particular direction determined by a movement direction of the rubbing roll.

A liquid crystal layer is aligned in the same direction in which the chains of the organic polymer are arranged by the rubbing alignment. That is, the movement direction of the rubbing roll is the same as the alignment direction of the liquid crystal.

However, the related art rubbing alignment has the following disadvantages.

First, when the arrangement of the rubbing cloth is non-uniform, regions allowing light leakage may be created in the liquid crystal layer during the rubbing alignment. FIG. 2 is a perspective view schematically illustrating a rubbing cloth having a non-uniform arrangement.

As described above, elements such as thin film transistors, color filter layers and electrode layers may be formed on a substrate. As illustrated in FIG. 2, when a rubbing roll 30 is rolled over elements formed on a substrate 10 or 20, parts 32a of a rubbing cloth 32 covering the rubbing roll 30 may be disturbed into a non-uniform arrangement. The non-uniform arrangement of the rubbing cloth 32 causes a non-uniform array of chains of an organic polymer in regions of the substrate rubbed by the disturbed parts 32a of the rubbing cloth. As a result, the alignment of the liquid crystal layer is not uniform, resulting in light leakage during operation of the liquid crystal display.

Secondly, in regions where a rubbing cloth does not contact the substrate, light leakage may occur. FIG. 3 is a perspective view schematically illustrating an arrangement in which a rubbing cloth does not contact a region of the substrate.

As described above, the elements formed on a substrate may include electrode layers, such as pixel and common electrodes. As illustrated in FIG. 3, the vertical edge of an electrode layer formed on a substrate 10 creates a region (region "A") in which a rubbing cloth 32 cannot contact the substrate 10 during a rubbing alignment. As a result, the alignment of a liquid crystal layer is not uniform in region "A", resulting in light leakage during operation of the liquid crystal display.

The rubbing alignment method of the related art may create regions where the liquid crystal layer is not properly aligned in regions where the alignment layer is rubbed using a rubbing cloth having a non-uniform arrangement or in regions where the rubbing cloth does not contact the substrate. These regions of improperly aligned liquid crystal cause light leakage problems during operation of the liquid crystal display.

SUMMARY OF THE INVENTION

Accordingly, the present invention is directed to a method of forming an alignment layer for a liquid crystal display device that substantially obviates one or more problems due to limitations and disadvantages of the related art.

An advantage of the present invention is to provide a method of forming an alignment layer for a liquid crystal display device without causing light leakage problems associated with the related art rubbing alignment method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for forming an alignment layer for a liquid crystal display, includes preparing a substrate; coating the substrate with an alignment material for initial alignment of liquid crystal; rubbing the substrate coated with the alignment material; and applying a field flux to the substrate coated with the alignment material.

As described herein, a field flux (e.g., an electric or magnetic field) is applied to an alignment material and the alignment material is aligned in a particular direction. The present invention has been achieved based on this finding.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

As illustrated in the embodiments described herein, according to the present invention, a field flux (e.g., an electric field or a magnetic field) may be applied to an alignment layer to provide an alignment direction in accordance with the direction of the field flux.

Hereinafter, a method of forming an alignment layer for a liquid crystal display device according to the present invention will be described with reference to the accompanying drawings.

FIGS. 4A to 4D are process diagrams illustrating forming an alignment layer for a liquid crystal display device by application of an electric field according to one embodiment of the present invention.

Figure 1:
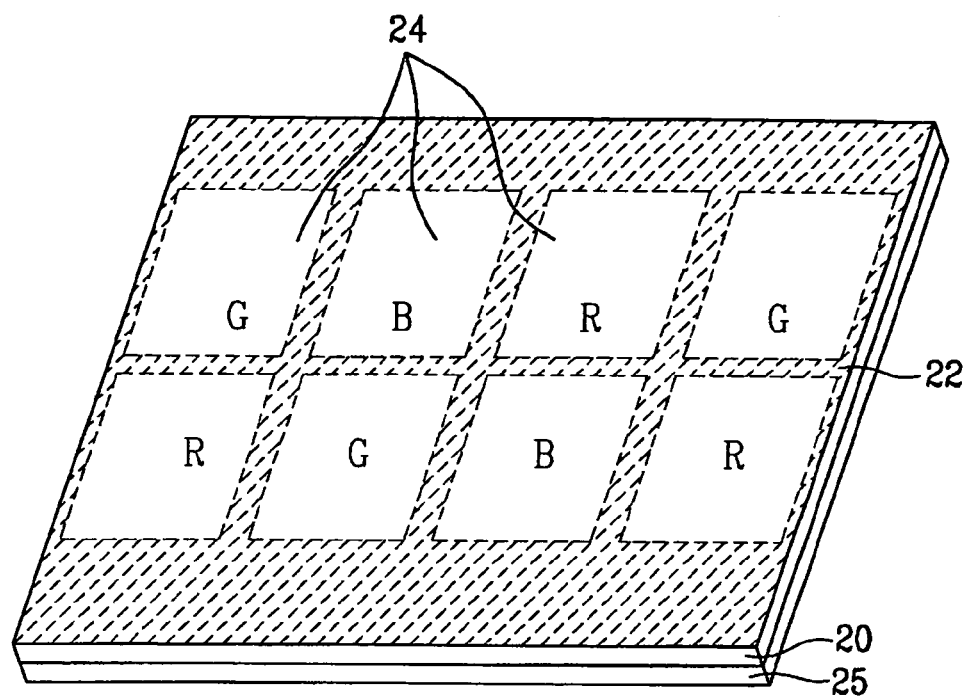
FIG. 1 is an exploded perspective view of a TN mode liquid crystal display of the related art.
Figure 1:
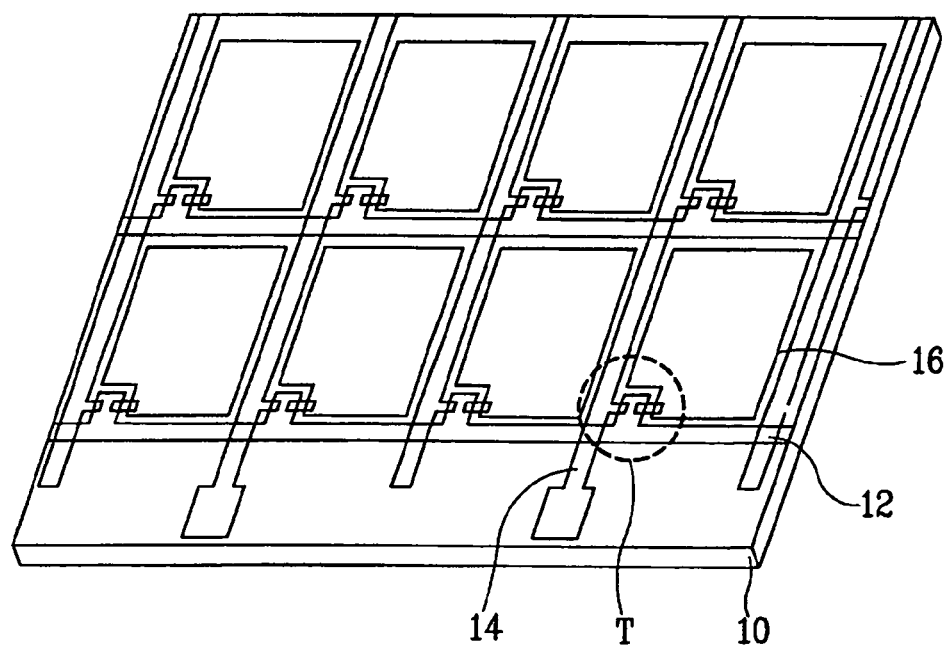
Figure 2:
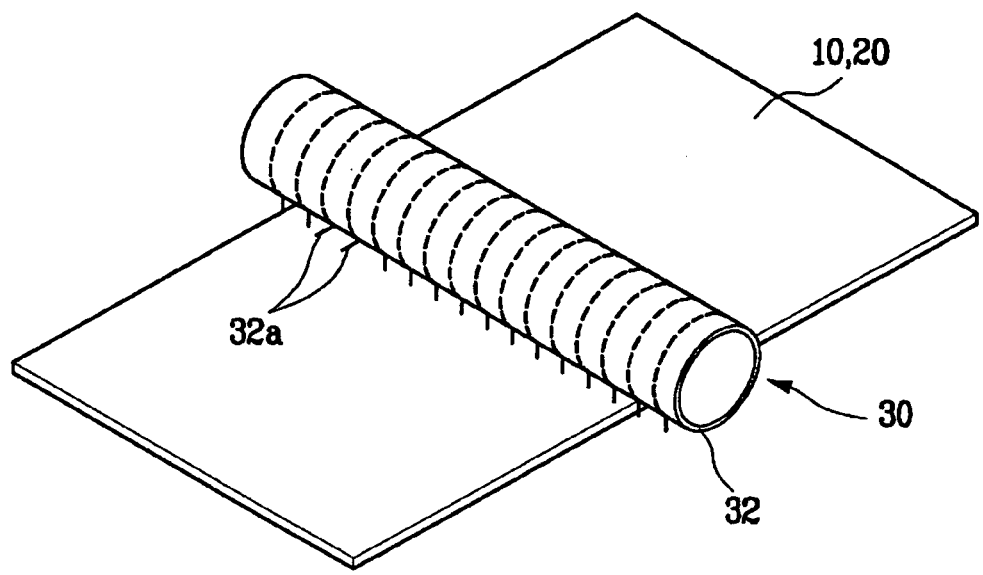
FIG. 2 is a perspective view schematically illustrating a rubbing cloth having a non-uniform arrangement.
Figure 3:
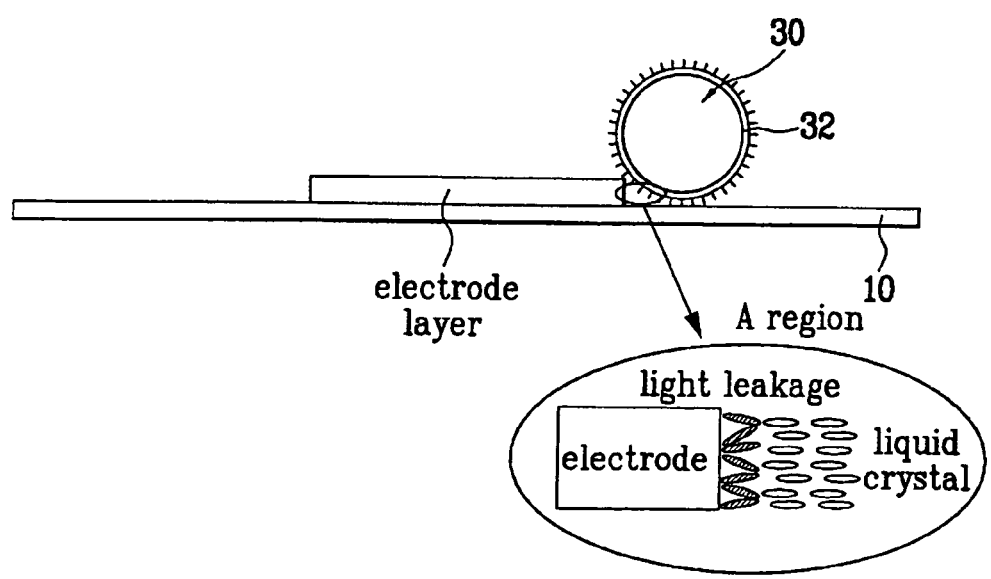
FIG 3. is a perspective view schematically illustrating an arrangement in which a rubbing cloth does not contact a region of the substrate.
Figure 4A:
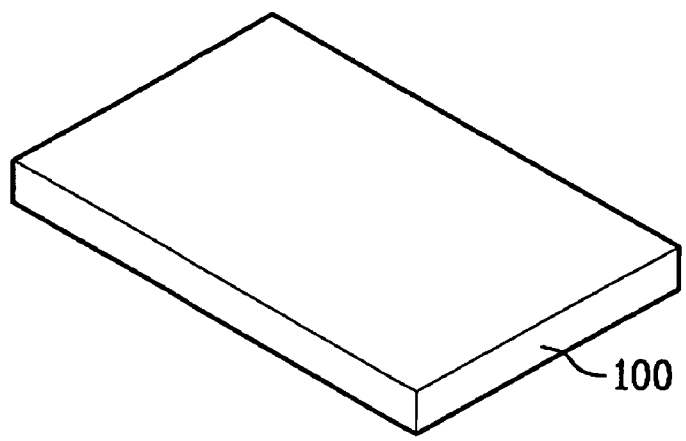
FIGS. 4A to 4D are process diagrams illustrating forming an alignment layer for a liquid crystal display device according to one embodiment of the present invention.

First, as shown in FIG. 4A, a substrate 100 is prepared.

The substrate 100 is one of the substrates for a liquid crystal display device, and may be a thin film transistor substrate having thin film transistors formed thereon or a color filter substrate having color filters formed thereon. The substrate 100 may be a thin film transistor substrate or a color filter substrate. The constituent elements formed on the substrate 100 may vary depending on the mode of liquid crystal display device.

For example, in the case where the substrate 100 is a thin film transistor substrate for a TN (twisted nematic) mode liquid crystal display device, gate lines and data lines crossing each other are formed on a transparent substrate to define pixel regions; thin film transistors including a gate electrode, a source electrode, and a drain electrode are formed at crossings of the gate lines and the data lines; and pixel electrodes connecting to the drain electrode of the thin film transistors are formed within the pixel regions.

In the case where the substrate 100 is a thin film transistor substrate for an in-plane switching (IPS) mode liquid crystal display device, gate lines and data lines crossing each other on a transparent substrate are formed to define pixel regions; thin film transistors including a gate electrode, a source electrode and a drain electrode are formed at crossings of the gate lines and the data lines; pixel electrodes connecting to the drain electrodes of the thin-film transistors are formed within the pixel regions; and common electrodes are formed substantially parallel to the pixel electrodes.

When the substrate 100 is a color filter substrate for a TN mode liquid crystal display device, a light-blocking layer is formed on a transparent substrate to prevent light leakage; a green/red/blue (RGB) color filter layer is formed on the light-blocking layer; and a common electrode is formed on the color filter layer.

Further, in the case where the substrate 100 is a color filter substrate for an IPS mode liquid crystal display device, a light-blocking layer is formed on a transparent substrate to prevent light leakage; a green/red/blue (RGB) color filter layer is formed on the light-blocking layer; and an overcoat layer is formed on the color filter layer to planarize the substrate.

Modifications and variations of the materials and formation methods of the constituent elements formed on the substrate 100 will be appreciated by those skilled in the art.

Figure 4B:
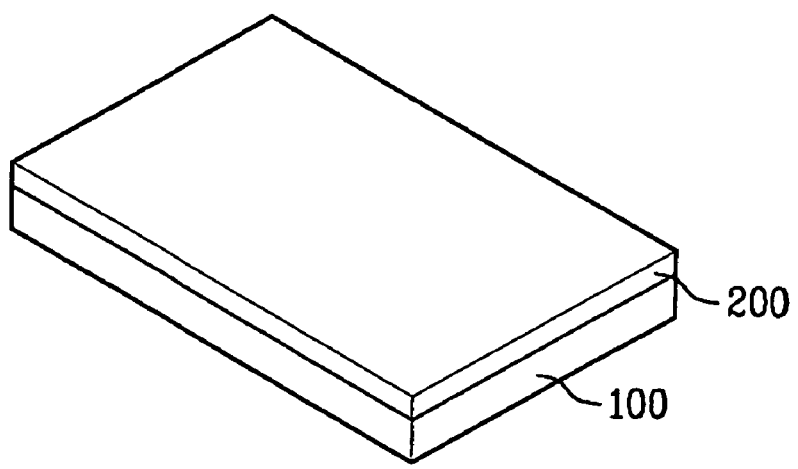

As shown in FIG. 4B, an alignment material 200 is applied to the substrate.

Any material whose alignment direction may be arranged by an applied electric field as will be described below, may be used as the alignment material 200. The alignment material may include a polymeric material such as, polyimide, polyamic acid, polyvinylcinnamate, polyazobenzene, polyethyleneimine, polyvinyl alcohol, polyamide, polyethylene, polystyrene, polyphenylenephthalamide, polyester, polyurethane, and polymethyl methacrylate.

Figure 4C:
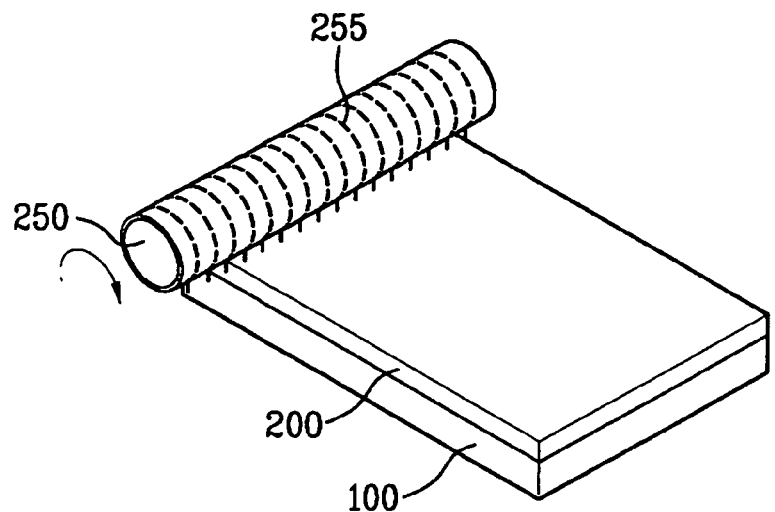

As shown in FIG. 4C, the substrate 100 coated with the alignment material 200 is rubbed in a desired direction using a rubbing roll 250 covered with a rubbing cloth 255.

Figure 4D:
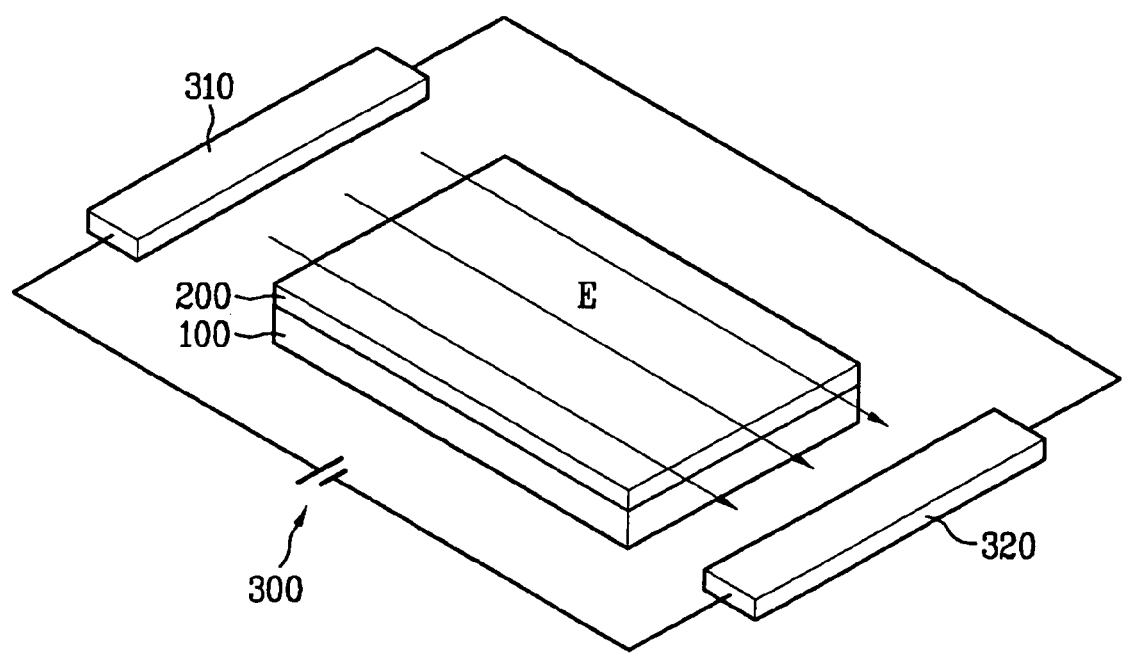

As shown in FIG. 4D, an electric field E is applied to the substrate 100 coated with the alignment material 200 using an electric field generator 300. The direction of the applied electric field E determines the alignment direction of the alignment material 200.

The electric field generator 300 includes an anode 310 and a cathode 320 positioned opposite the anode 310, the anode 310 and cathode 320 adjacent to the substrate 100 coated with the alignment material 200. An electric field E is generated between the anode 310 and the cathode 320, the electric field having the direction indicated by arrows in FIG. 4D. Although the anode 310 and the cathode 320 are shown not to contact the substrate 100 in FIG. 4D, the anode 310 and the cathode 320 may contact respective sides of the substrate 100 if required considering the intensity of the generated electric field.

Applying the electric field E to the alignment layer aligns the alignment material 200 in the direction of the electric field. The electric field may be applied in the substantially the same direction as the rubbing direction of the alignment material 200.

Figure 5A:
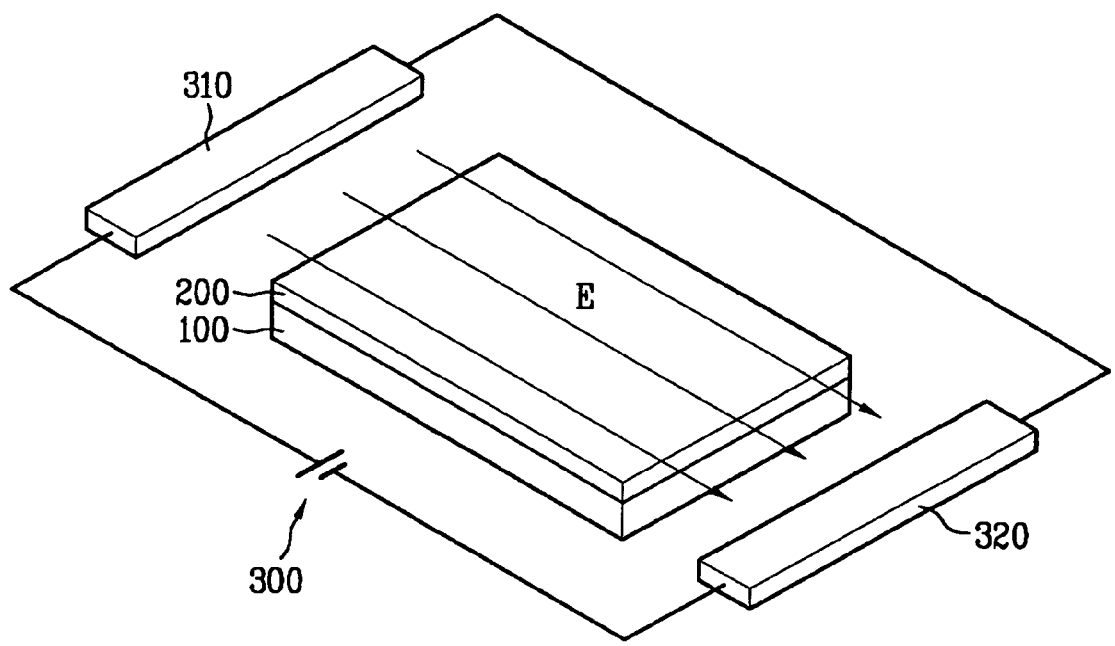
FIGS. 5A to 5C are diagrams schematically illustrating various states wherein an electric field is applied in accordance with one embodiment of the present invention.
Figure 5B:
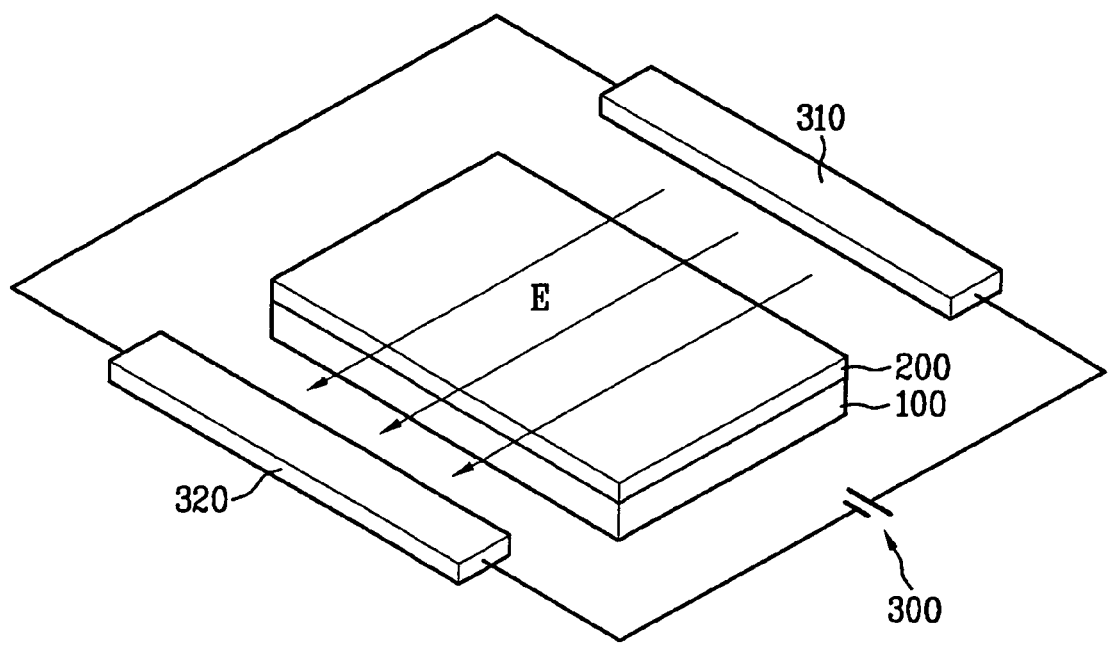

Accordingly, when the rubbing direction of the alignment material 200 is parallel to the X-axis, an electric field may be applied in the direction substantially parallel to the X-axis, as illustrated in FIG. 5A. Where it is desired to align the alignment material 200 in the direction perpendicular to the X-axis, an electric field may be applied in the direction perpendicular to the X-axis, as illustrated in FIG. 5B. Where it is desired to align the alignment material 200 in a direction diagonal to the X-axis, an electric field may be applied in the direction diagonal to the X-axis, as illustrated in FIG. 5C.

Figure 5C:
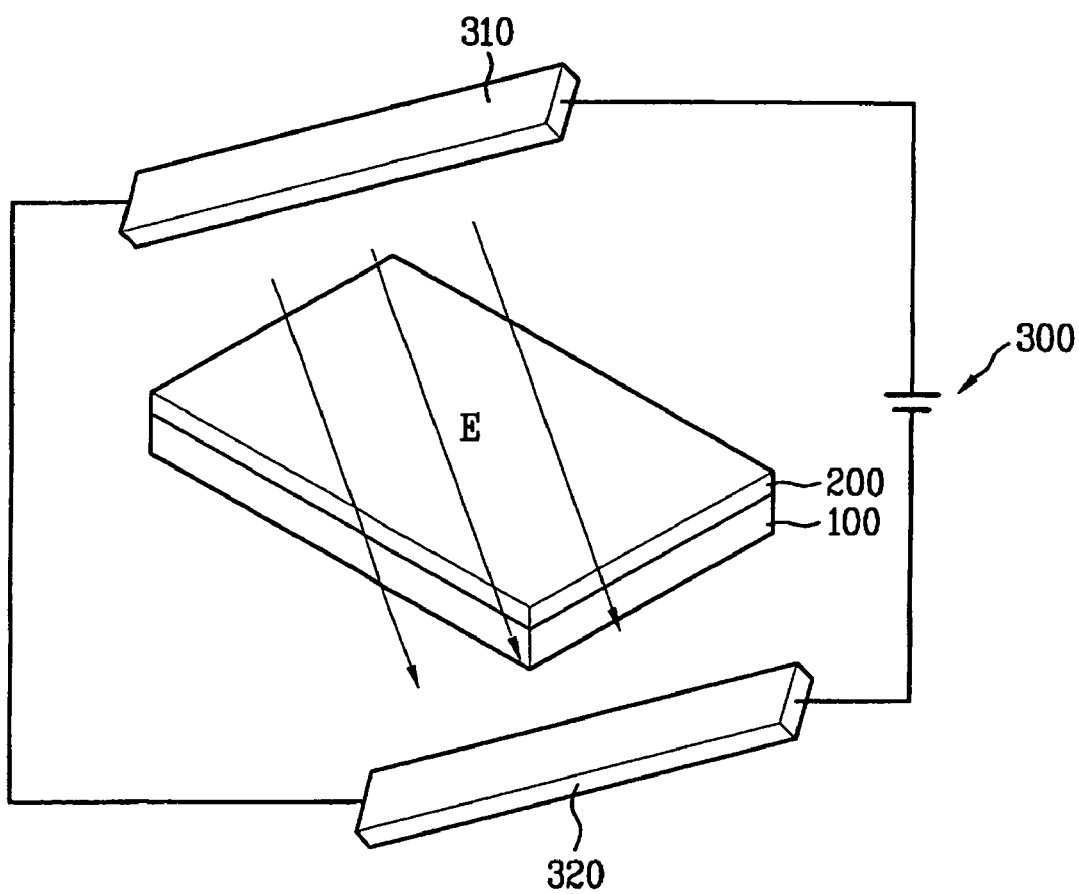

As illustrated in FIGS. 5A to 5C, the electric field generator 300 or the substrate 100 may be rotated to vary the direction of the electric field applied to the alignment material.

The step of applying the alignment material 200 illustrated in FIG. 4B, the step of rubbing the substrate illustrated in FIG. 4C, and the step of applying the electric field illustrated in FIG. 4D may be carried out consecutively to shorten processing time.

FIGS. 6A to 6D are process diagrams schematically illustrating forming an alignment layer for a liquid crystal display by application of a magnetic field according to another embodiment of the present invention.

Figure 6A:
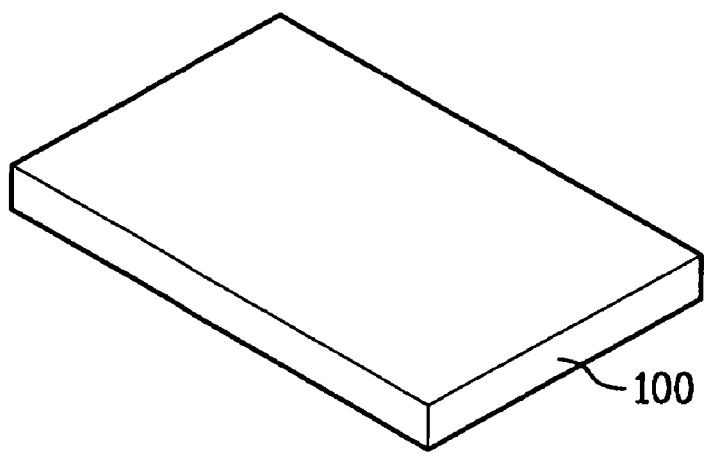
FIGS. 6A to 6D are process diagrams illustrating forming an alignment layer for a liquid crystal display device according to another embodiment of the present invention.

First, as illustrated in FIG. 6A, a substrate 100 is prepared.

The constituent elements formed on the substrate 100 may vary depending on the mode of liquid crystal display devices, as previously described for the electric field embodiment. The transparent substrate 100 may be a glass substrate or may be a flexible or plastic substrate.

Figure 6B:
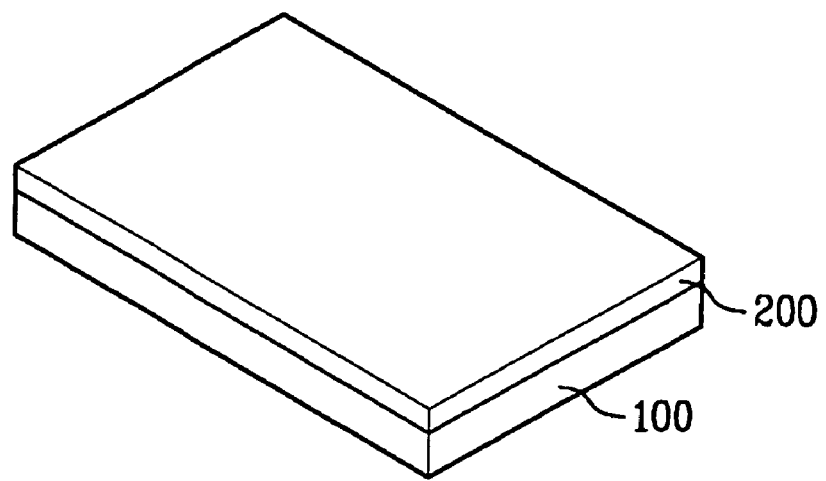

As illustrated in FIG. 6B, an alignment material 200 is applied to the substrate 100.

The materials used in the alignment material 200 may be same as those described for use with an electric field.

Figure 6C:
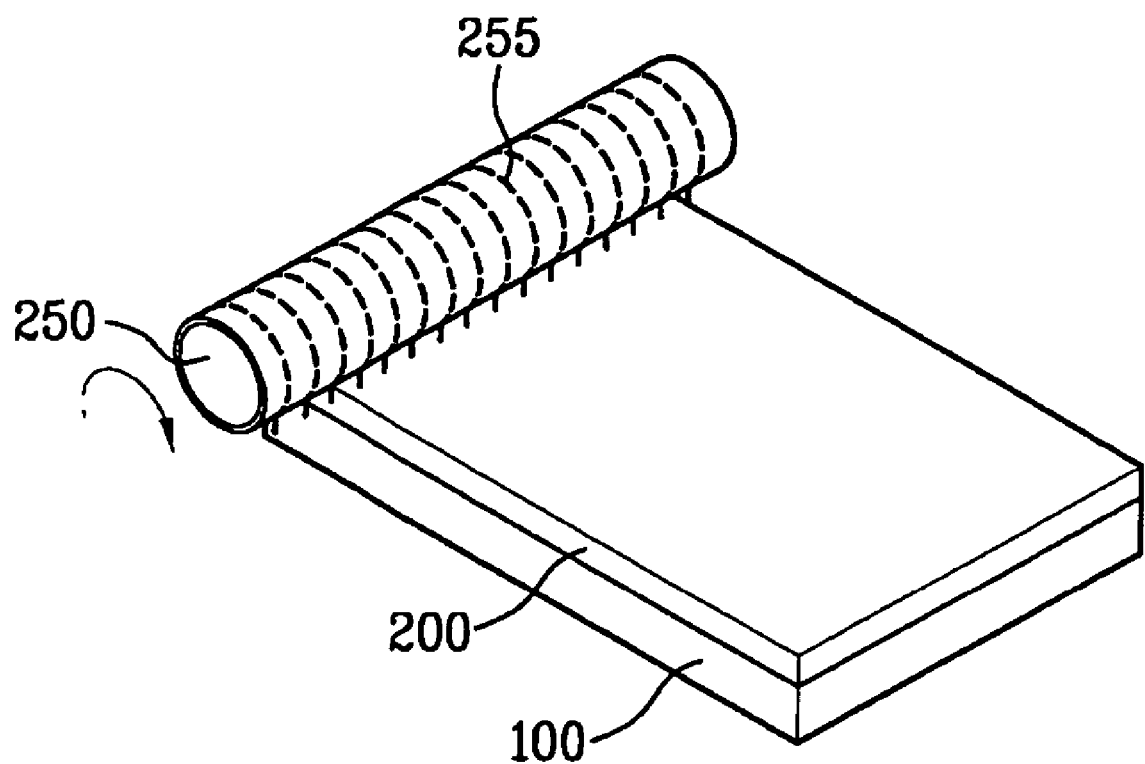

As illustrated in FIG. 6C, the substrate coated with the alignment material 200 is rubbed in a desired direction by a rubbing roll 250 covered with a rubbing cloth 255.

Figure 6D:
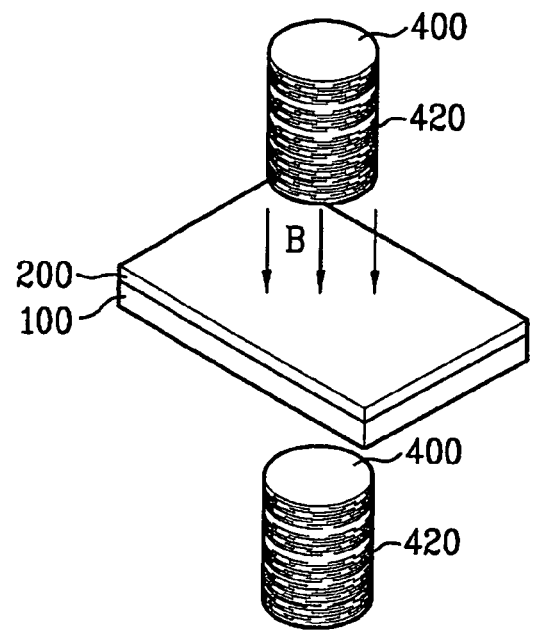
Figure 6D:
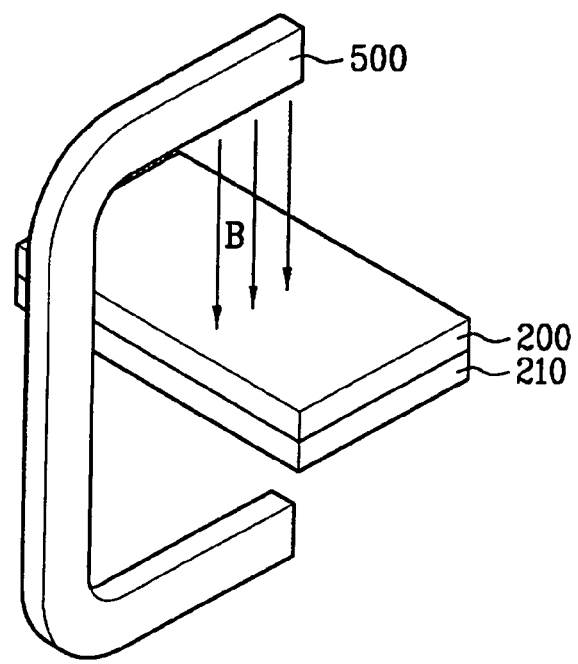

As shown in FIG. 6D, a magnetic field B is applied to the alignment material 200 using a magnetic field generator 400 or 500. The direction of the applied magnetic field B determines the alignment direction of the alignment material 200.

The magnetic field B can be applied using an electromagnet system in which a pair of electromagnets 400 wound with coils 420 are arranged to face each other through the substrate or a horseshoe magnet 500 surrounding the substrate as illustrated in FIG. 6D. Magnetic field generators having forms other than the particular forms illustrated may be used.

Using an electric field to align the alignment material may require that the electric field electrodes contact the substrate while applying the electric field. Placing the electric field electrodes in contact with the substrate requires an additional positioning process during the preparation of the alignment material. However, when a magnetic field is employed, no contact between the magnetic field generator and the substrate is required, and the additional positioning process may be eliminated. The elimination of the positioning process reduces processing time, resulting in increased productivity.

Since the magnetic field aligns the alignment material 200 in a direction perpendicular to the direction of the applied the magnetic field, the magnetic field may be applied in the direction substantially perpendicular to the desired alignment direction of the alignment material 200.

The magnetic field generator 400 or 500 or the substrate 100 may be rotated to vary the direction in which the magnetic field is applied.

The step of applying the alignment material 200 illustrated in FIG. 6B, the step of rubbing the substrate illustrated in FIG. 6C, and the step of applying the magnetic field to the alignment material 200 illustrated in FIG. 6D may be carried out consecutively to shorten processing time.

In the above description, the field flux (e.g., an electric or magnetic field) is described as being applied after performing the rubbing process. However, the field flux may be applied before performing the rubbing process. Alternatively, the rubbing process and the field flux application process may be performed at the same time.

Accordingly, the method of forming the alignment layer according to the present invention has the following advantages.

Although the rubbing alignment may create regions where the liquid crystal is not properly aligned, alignment in these regions can be corrected by applying a field flux. Accordingly, the problem of light leakage caused by rubbing alignment can be solved.

Furthermore, since the steps of applying an alignment material and applying field flux to the alignment material can be carried out in a consecutive manner, processing time is shortened.

Moreover, the alignment direction in an alignment material may be freely varied by rotating a field flux generator (e.g. electric field generator or magnetic field generator) or rotating the substrate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for forming an alignment layer for a liquid crystal display, comprising:
    preparing a substrate;
    coating the substrate with an alignment material for initial alignment of liquid crystal;
    rubbing the substrate coated with the alignment material in a rubbing direction; and
    applying a field flux to the substrate coated with the alignment material, wherein the field flux is an electric field applied in substantially the same direction as the rubbing direction.

2. The method of claim 1, wherein applying the field flux includes varying the direction of the field flux in a direction parallel, perpendicular or diagonal to an X-axis depending on the rubbing direction.

3. The method of claim 2, wherein varying the direction of the field flux applied includes rotating a field flux generator while maintaining the substrate stationary.

4. The method of claim 2, wherein the varying the direction of the field flux applied includes rotating the substrate while maintaining a field flux generator stationary.

5. The method of claim 1, wherein applying the alignment material, rubbing the substrate, and applying the field flux are performed consecutively.

6. The method of claim 1, wherein preparing the substrate includes:
   forming gate lines and data lines crossing each other on a transparent substrate to define pixel regions;
   forming thin film transistors including a gate electrode, a source electrode, and a drain electrode at crossings of the gate lines and the data lines; and
   forming pixel electrodes connecting to the drain electrode of the thin film transistors.

7. The method of claim 1, wherein preparing the substrate includes:
   forming gate lines and data lines crossing each other on a transparent substrate to define pixel regions;
   forming thin film transistors including a gate electrode, a source electrode, and a drain electrode at crossings of the gate lines and the data lines;
   forming pixel electrodes connecting to the drain electrode of the thin film transistors; and
   forming a common electrode parallel to the pixel electrodes.

8. The method of claim 1, wherein the preparing the substrate includes:
   forming a light-blocking layer on a transparent substrate to prevent light leakage;
   forming a green/red/blue color filter layer on the light-blocking layer; and
   forming a common electrode on the color filter layer.

9. The method of claim 1, wherein preparing the substrate includes:
   forming a light-blocking layer on a transparent substrate to prevent light leakage;
   forming a green/red/blue color filter layer on the light-blocking layer; and
   forming an overcoat layer on the color filter layer.

10. The method of claim 1, wherein the alignment material includes a polymeric material selected from the group consisting of polyimide, polyamic acid, polyvinylcinnamate, polyazobenzene, polyethyleneimine, polyvinyl alcohol, polyamide, polyethylene, polystyrene, polyphenylenephthalamide, polyester, polyurethane, and polymethyl methacrylate.

11. The method of claim 1, wherein applying the field flux is performed before rubbing the substrate.

12. The method of claim 1, wherein applying the field flux is performed after rubbing the substrate.

13. The method of claim 1, wherein applying the field flux and rubbing the substrate are performed at the same time.

* * * * *